US008990609B2

(12) United States Patent
Lee et al.

(10) Patent No.: US 8,990,609 B2
(45) Date of Patent: Mar. 24, 2015

(54) CIPHER-CONTROLLING METHOD, NETWORK SYSTEM AND TERMINAL FOR SUPPORTING THE SAME, AND METHOD OF OPERATING TERMINAL

(71) Applicant: Samsung Electronics Co., Ltd., Gyeonggi-do (KR)

(72) Inventors: Sanghyun Lee, Seoul (KR); Nohsun Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 196 days.

(21) Appl. No.: 13/633,203

(22) Filed: Oct. 2, 2012

(65) Prior Publication Data

US 2013/0086412 A1    Apr. 4, 2013

(30) Foreign Application Priority Data

Oct. 4, 2011 (KR) .................. 10-2011-0100755

(51) Int. Cl.
*G06F 11/00* (2006.01)
*H04W 12/02* (2009.01)
*H04L 29/06* (2006.01)

(52) U.S. Cl.
CPC .............. *H04W 12/02* (2013.01); *H04L 63/205* (2013.01)
USPC .................................. 714/3; 714/4.1; 714/43

(58) Field of Classification Search
CPC . G06F 11/07; G06F 11/0748; G06F 11/0793; G06F 11/3006
USPC .............. 714/3, 4.1, 4.21, 4.3, 4.4, 25, 18, 37, 714/43, 47.1, 56; 713/160, 161, 162
See application file for complete search history.

(56) References Cited

U.S. PATENT DOCUMENTS

| 5,841,873 A * | 11/1998 | Lockhart et al. ............. 713/181 |
| 2003/0035547 A1* | 2/2003 | Newton ......................... 380/279 |
| 2004/0136533 A1* | 7/2004 | Takagaki et al. .............. 380/255 |
| 2008/0205650 A1* | 8/2008 | Forsberg ....................... 380/272 |
| 2010/0098254 A1* | 4/2010 | Chowdhary et al. .......... 380/270 |
| 2011/0314275 A1* | 12/2011 | Gopshtein et al. ............. 713/165 |

FOREIGN PATENT DOCUMENTS

| EP | 2 187 561 A1 | 5/2010 |
| WO | 99/39525 A1 | 8/1999 |

OTHER PUBLICATIONS

3rd Generation Partnership Project (3GPP) Standard; "3GPP System Architecture Evolution (SAE) : Security architecture (Release 8) 3GPP TS 33.401"; Jun. 1, 2009; XP050376847; section 7.2.4.
3rd Generation Partnership Project (3GPP) Standard; "Mobile Station (MS) Conformance Specification (Release 7) 3GPP TS 51.010-1"; Jan. 11, 2009; pp. 1093-1237; XP050553667; section 26.6.8.4.

* cited by examiner

*Primary Examiner* — Joseph D Manoskey
(74) *Attorney, Agent, or Firm* — Cha & Reiter, LLC

(57) ABSTRACT

Disclosed are a cipher control method which supports to maintain a cipher mode between a network system and a terminal. The method of controlling an encryption includes: attempting a connection for operating a communication channel between a terminal and a network system; providing cipher information about a cipher algorithm operation of the terminal to the network system; determining whether the terminal is a problematic terminal operating an abnormal cipher algorithm by the networking system; and when the terminal is determined to be operating abnormal, instructing the terminal to perform a communication channel operation based on a normally operable cipher algorithm by the network system.

19 Claims, 11 Drawing Sheets

CIPHER-CONTROLLING METHOD, NETWORK SYSTEM AND TERMINAL FOR SUPPORTING THE SAME, AND METHOD OF OPERATING TERMINAL

CLAIM OF PRIORITY

This application claims the benefit under 35 U.S.C. §119 (a) of a Korean patent application filed on Oct. 4, 2011 in the Korean Intellectual Property Office and assigned Serial No. 10-2011-0100755, the entire disclosure of which is hereby incorporated by reference.

BACKGROUND OF THE INVENTION

1. Field of the Invention

The present invention relates to a cipher control, and more particularly, to a cipher control method which supports to maintain a cipher mode between a network system and a terminal, and a network system and terminal for supporting the same.

2. Description of the Related Art

A portable terminal supports a mobile communication function and has been used in many fields due to easy convenience and portability. The portable terminal performs camping on a network system for supporting a communication function, such that a communication channel is formed between the portable terminal and the network system. Here, a portable terminal currently performs a cipher mode setting to perform a communication based on a specific cipher algorithm after forming a communication channel. To achieve this, a portable terminal stores a cipher algorithm for supporting a cipher mode, encrypts a message transmitted through the stored cipher algorithm and decrypts a received message.

Meanwhile, when a new cipher algorithm is introduced, a cipher algorithm of the portable terminal is updated to the new cipher algorithm, such that the portable terminal communicates with the network system based on the updated cipher algorithm. This function is needed for securing the portable terminal from hacking and transmitting/receiving a message more effectively.

However, a cipher algorithm operation of a portable terminal may occasionally cause an unexpected problem. That is, the cipher algorithm stored in the portable terminal may not be worked properly. Such a defective problem may be caused by various factors. For example, there is a problem in the cipher algorithm itself stored in a portable terminal, or there is a case where incorrect data may be stored in a portable terminal due to a data error caused when updating an updated cipher algorithm. However, the portable terminal cannot appropriately identify whether there is a problem in the cipher algorithm stored or installed therein before performing communication. Moreover, because a step of exchanging cipher information related to a cipher algorithm is performed in a link layer, a high layer of the portable terminal merely recognizes the problem as a signal transmitting/receiving problem caused in the link layer even there is a problem in the cipher information. As the result, unnecessary message transmission/reception that is continued for operating a channel can be performed as the terminal is unable to recognize its problem.

SUMMARY OF THE INVENTION

The present invention has been made in view of the above problems, and provides a cipher-controlling method which can support to progress a message exchanging procedure for monitoring a communication channel operation to recognize a problem of cipher information in a terminal and a network and resolving the problem.

In accordance with an aspect of the present invention, a method of exchanging cipher information between a terminal and a network system includes: providing, by the terminal, cipher information about a cipher algorithm to the network system; determining whether the terminal is operating an abnormal or defective cipher algorithm by the network system; and if so, instructing the terminal to perform a communication channel operation based on a normally operable cipher algorithm by the network system.

In accordance with another aspect of the present invention, a terminal for supporting a cipher control includes: a radio frequency communication unit for supporting formation of a communication channel with a network system, a memory for storing a cipher information including plural cipher algorithms of encrypting data required for operating the communication channel with the network system; and a controller for providing the cipher information to the network system and controlling such that a communication channel operation is performed based on a cipher algorithm indicated by the network system.

In accordance with another aspect of the present invention, a communication system for supporting a cipher control includes: terminal for storing plural cipher algorithms and performing a communication channel operation with the network system based on a predetermined cipher algorithm of the plural cipher algorithms; and the network system for performing the communication channel operation with the terminal, identifying whether the terminal is operating based on an abnormal or defective cipher algorithm, and instructing the terminal to performs a communication according to a normally operable cipher algorithm based on the identification outcome.

In accordance with another aspect of the present invention, a method of operating a terminal supporting cipher control includes: transmitting cipher information to a network system, the cipher information including a plural cipher algorithms which encrypts data transmitted and received when a communication channel is operated with the network system; and performing a communication channel operation based on a cipher algorithm indicated by the network system.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

Figure 1:
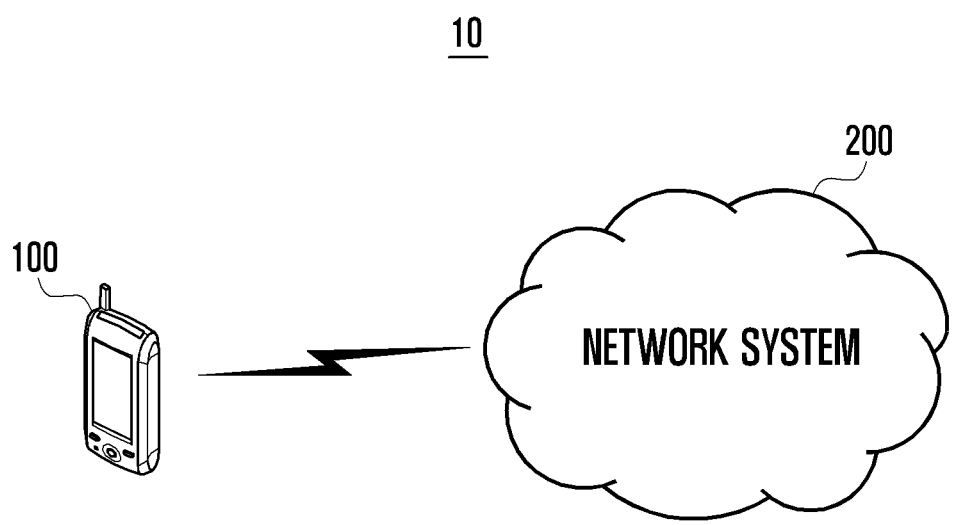
FIG. 1 is a view substantially illustrating a configuration of a communication system for supporting a cipher control according to an exemplary embodiment of the present invention.

FIG. 1 is a view substantially illustrating a configuration of a communication system for supporting a cipher control operation according to one embodiment of the present invention.

Referring to FIG. 1, the communication system 10 of the present invention may include a terminal 100 and a network system 200.

The system 10 may exclude a use of an abnormal or defective cipher algorithm of various versions of cipher algorithms stored in the terminal 100, and select a normally operable or working cipher algorithm to support communication through it. To this end, the network system 200 determines whether a problem is generated in a cipher algorithm which the terminal 100 experiences while operating a communication channel and taking measures against the problem to support a communication channel operation to be normally performed. The network system 200 may determine whether there is a problem in a cipher algorithm of the terminal 100, and if so, control the terminal 100 having an abnormal or defective cipher algorithm to select a normal or working cipher algorithm.

In operation, the terminal 100 selects a cipher algorithm according to a request from the network system 200 while operating a communication channel with the network system 200, and performs the communication channel operation based on the selected cipher algorithm. Further, the terminal 100 may recognize a problem of cipher information and support a normal communication operation with the network system 200. The detailed description of how to recognize the abnormal cipher information and remedying it will be described below in more detail with reference to FIGS. 9 to 11.

Figure 2:
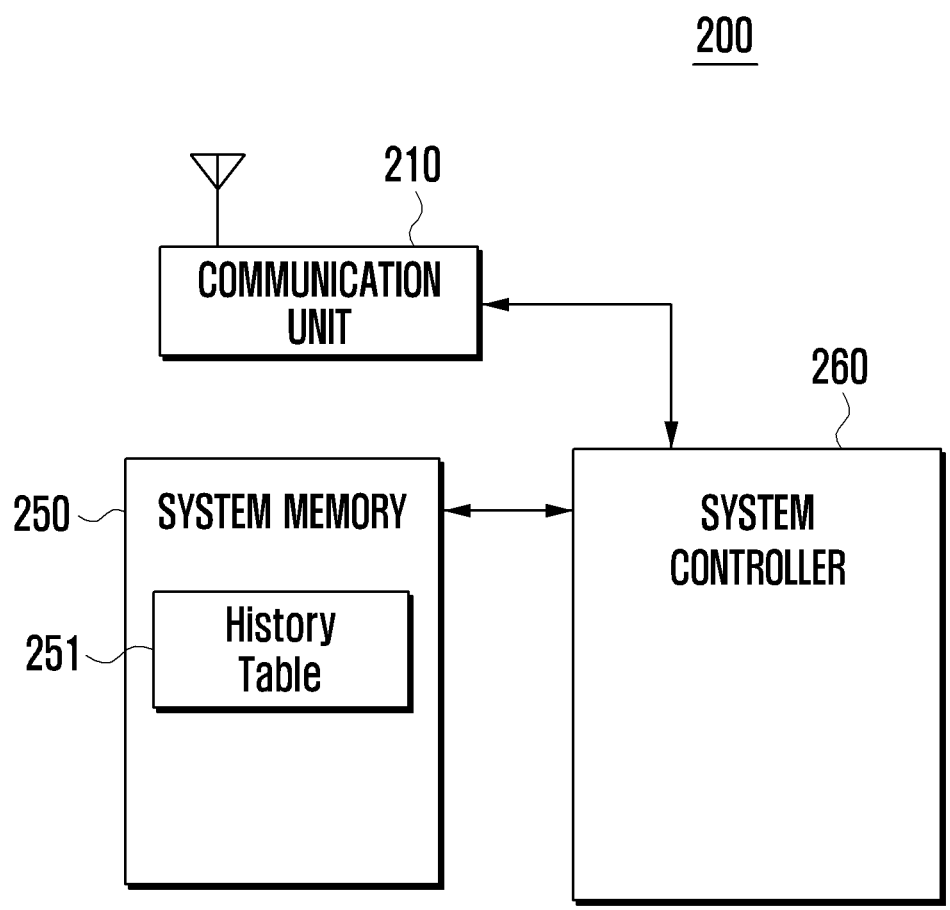
FIG. 2 is a block diagram illustrating a configuration of the network system according to another exemplary embodiment of the present invention.

FIG. 2 is a block diagram illustrating a configuration of the network system 200 for supporting a cipher control according to an embodiment of the present invention.

Referring to FIG. 2, the network system 200 according to the present invention may include a communication unit 210, a system controller 260, and a system memory 250.

The communication unit 210 may include various physical elements. That is, the communication unit 210 may include a base station for transmitting and receiving signals to and from the terminal 100, an antenna installed at the base station, an antenna control system for controlling an antenna, and a signal transmitting and receiving support system for controlling signal transmission and reception through the antenna. The base station be may a wireless access point according to a communication type of the terminal 100. The communication unit 210 receives a message required for a communication channel operation from the terminal 100, and transfers a message corresponding to corresponding signals according to a control of the system controller 260 to the terminal 100.

The system memory 250 stores various information required for operating the network system 200. That is, the system memory 250 may store a management program for managing an operation system required for operating the network system 200 and information for managing terminals 100. In particular, the system memory 250 may store a history table 251 including identity information about terminals 100 having a problem in cipher information, that is terminals 100 operating an abnormal or defective cipher algorithm. The identity information about the terminals 100 may be International Mobile Equipment Identity (IMEI) information. Further, the identity information about the terminals 100 may be specific information such as a telephone number, etc.

Moreover, the history table 251 may include various information related to access to the network system 200 by the terminals 100. In particular, the history table 251 may include IMEI information about the terminal 100 and flag information mapped onto corresponding IMEI information. The flag information is information indicating whether the terminals 100 have communication problem or not. The history table 251 may perform the updating of information about the terminal 100 which does not have information about a cipher.

The system controller 260 may control the communication unit 210 to control message transmission and reception necessary for connecting to the terminal 100 requesting a connection, and control various data transmission and reception according to a request of a connected terminal 100. In particular, the system controller 260 identifies cipher information related to cipher algorithm operations of the terminals 100 during connection process of the terminal 100, and identifies whether a normal operation occurs based on corresponding cipher information. When a specific terminal 100 does not perform the normal operation based on indicated cipher information, the system controller 260 may perform a management of the specific terminal 100 after instructing the specific terminal 100 to perform the message transmission and reception with a specific cipher algorithm. In this process, the system controller 260 may collect identity information about a terminal 100 having a problem in encryption, and by recording the information in the history table 251, continue to manage the terminal 100 having a cipher problem.

Meanwhile, when the problem related to encryption caused in a specific terminal 100 is resolved, the system controller 260 may remove history related to the specific terminal from the history table 251. By sharing the history table 251 with peripheral network apparatus, the system controller 260 may prevent a terminal 100 from causing a problem related to encryption when the terminal 100 moves and connects to another network. Further, when identifying cipher information about a terminal 100 having a problem related to encryption in a predetermined time period and addressing the problem, the system controller 260 may update the history table 251.

FIGS. 3 to 8 are diagrams illustrating a signal process between a network system 200 and a terminal 100 for supporting a method of controlling encryption according to an embodiment of the present invention.

Figure 3:
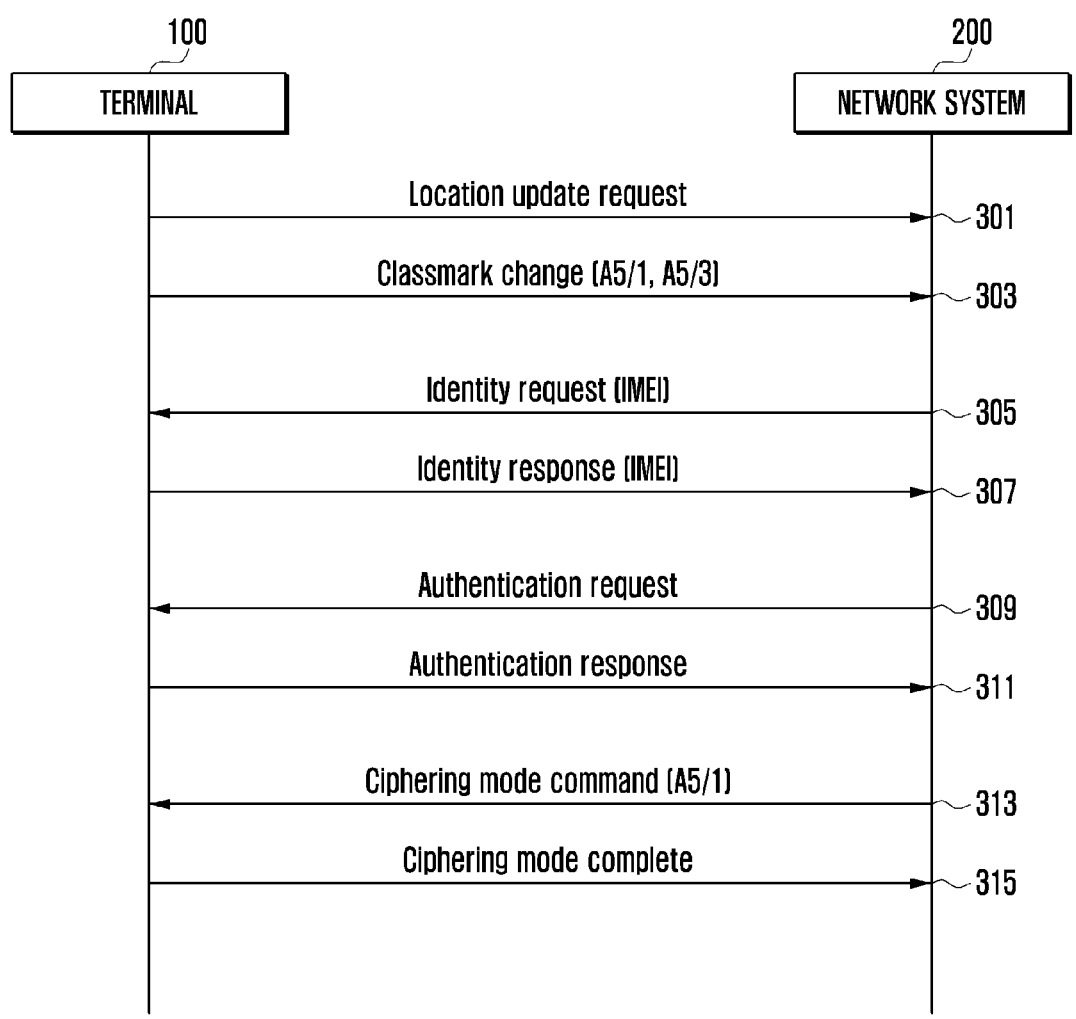
FIG. 3 is a signal flowchart illustrating a cipher-controlling procedure according to a first embodiment of the present invention.

In particular, FIG. 3 is a view illustrating a signal flow of performing the encryption control with a terminal 100 based on a history table 251, which includes identity information about the terminal 100.

In the following description, we assume that A5/1 and A5/3 stream cipher algorithms are different or similar from or to each other, and the A5/3 is of more recent version than the A5/1. However, it should be noted that the teachings of the present invention may be applicable to other stream cipher, such as A5/2 or other A5/X ciphers.

Referring to FIG. 3, the terminal 100 may transmit a location update request message to the network system 200 (301). At the same time, the terminal 100 may transfer a cipher information message (Clas-smark change (A5/1,A5/3)) related to a cipher algorithm application of itself to the network system 200. Then, the terminal 100 may be in a state of having two cipher algorithms, that are A5/1 and A5/3 and recognizing that the two modes are possible, thus the terminal 100 transmits the cipher information message (Clas-smark change (A5/1, A5/3)) of informing that the two cipher algorithms are all operable.

Meanwhile, the network system 200 may transmit an identity information request message (Identity request (IMEI)) for requesting identity information to the terminal 100 (305). In response, the terminal 100 transmits an identity information response message (Identity response (IMEI)) to the network system 200 (307).

Thereafter, the network system 200 receives the identity information response message (Identity response (IMEI)) from the terminal 100 and transmits an authentication information request message (Authentication request) for requesting authentication information (309). Then, the terminal 100 may transmit an authentication information response message (Authentication response) to the network system 200 in response to the authentication information request message (311). Here, the authentication information may be of information about whether the terminal 100 subscribes to the network system 200 to receive a communication service from the network system 200.

Then, the network system 200 may identify a history table 251 stored in the system memory 250 based on the identity and authentication information transmitted from the terminal 100. Here, since the history table 251 stores identity information about terminals having problems in the cipher control, the network system 200 may identify whether information matched onto corresponding information is included in the history table 251 base on the information transmitted from the terminal 100. To this end, the network system 200 may previously construct the history table 251 and may store history related to encryption information when a previously formed record of a communication channel exists, and also store history received from another network system. A detailed explanation of how the network system determines a particular mobile terminal is having a problem is explained later with reference to FIG. 4.

The network system 200 may identify the history table 251, identify the cipher information suitable for the terminal 100 which corresponds to the received IMEI, and transfer the first cipher mode instruction message (Ciphering mode command (A5/1)) to the terminal 100 indicating the working cipher information (313). That is, although the terminal 100 transmits the cipher information message (Classmark change (A5/1,A5/3)) indicating that the A5/1 and A5/3 algorithms all are operable, the network system 200 may identify whether the terminal 100 has a problem in the cipher process or not with reference to the IMEI information and the history table 251 of the terminal 100. When the terminal 100 is determined as a problematic terminal based on the previous history table where it indicates that the terminal 100 had a problem ciphering using A5/3, the network system 200 may identify that the network system 100 is able to communicate with the terminal 100 only through the A5/1.

If the terminal 100 receives the first cipher mode instruction message (Ciphering mode command (A5/1)), the terminal 100 may generate a cipher mode completion message (Ciphering mode complete) based on the cipher algorithm indicated in the message and perform a signal transmission/reception.

Figure 4:
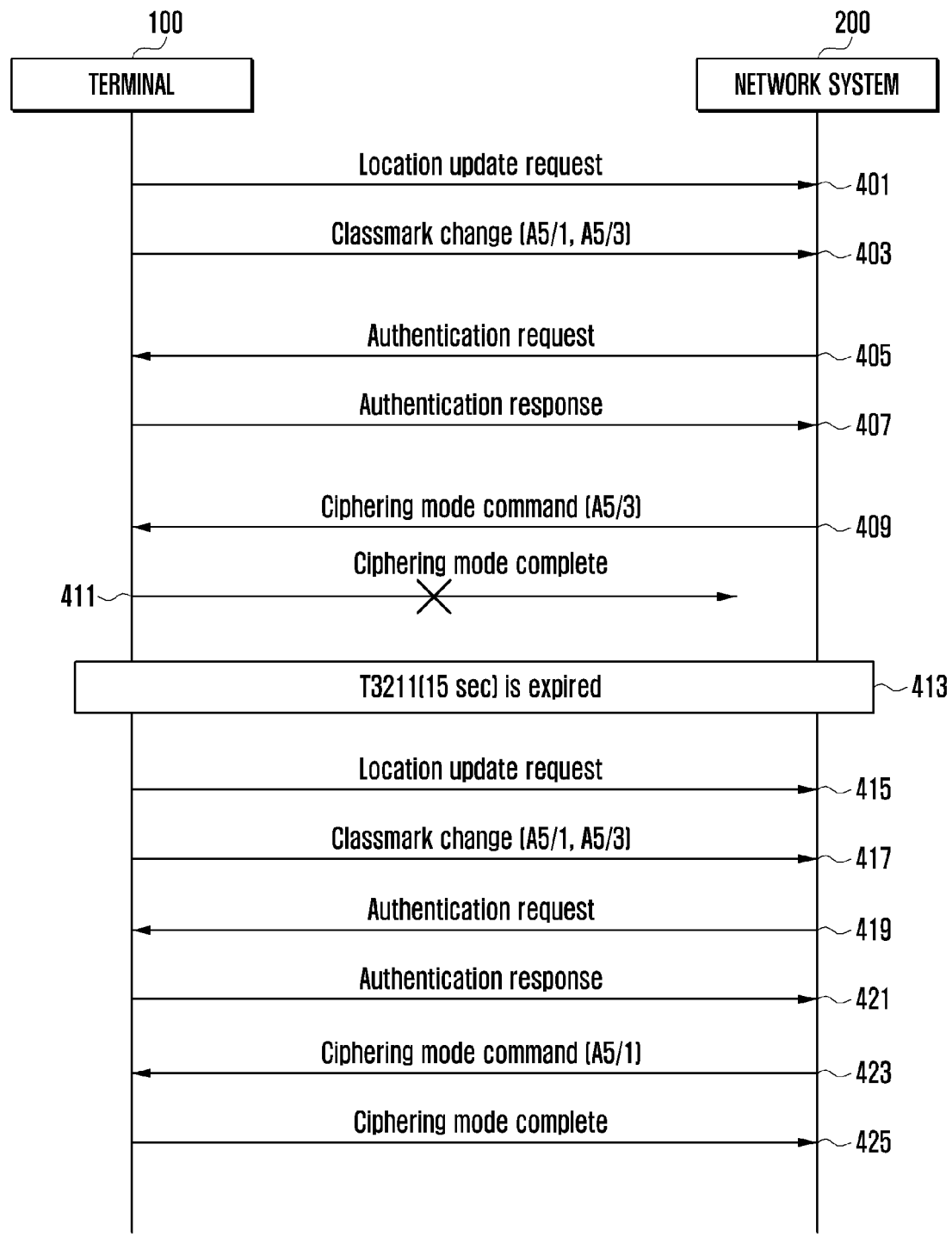
FIG. 4 is a signal flowchart illustrating a cipher-controlling procedure according to a second embodiment of the present invention.

FIG. 4 is a flowchart illustrating an operating procedure at a state that there is no identity information of the terminal 100 in a cipher control method according to an embodiment of the present invention. In the following description, it can be assumed that a version or class of the A5/3 cipher algorithm is relatively newer than of the A5/1 cipher algorithm.

Referring to FIG. 4, the terminal may transmit a location update request message (Location update request) to the network system 200 (401). That is, the terminal 100 may transmit the location update request message to the network system 200 for performing a booting process after or as entering communication coverage of the network system 200, or for any other purposes. At the same time, the terminal 100 may transmit to the network system 200, a cipher information message (Classmark change (A5/1,A5/3)) concerning its cipher algorithm application. At this time, as described at step 303 above, the terminal 100 may be at a state that the terminal 100 has, for example, two cipher algorithms, that are A5/1 and A5/3 and recognizes that two modes are all possible. However, in the following description, it can be assumed that the terminal 100 cannot normally operate the A5/3 cipher algorithm. This is caused by situations where the terminal 100 stores the A5/3 cipher algorithm, receives it from an external source, and does not perform a normal installation while installing it therein after storing it, or recognizes falsely that the algorithm is operable although the corresponding data are not normally received. Hence, in spite of updating the terminal 100 to a new cipher algorithm, before practically operating the new cipher algorithm, it is difficult for the terminal 100 to directly identify whether the updated cipher algorithm has a problem.

Meanwhile, the network system 200 transmits an authentication information request message to the terminal 100 (405). Then, the terminal 100 transmits an authentication information response message (Authentication response) to the network system 200 in response to the authentication information request message (407). The network system 200 identifies the authentication information of the terminal 100 and the previously received cipher information message (Classmark change (A5/1,A5/3)) and identifies which cipher algorithm is operable in the terminal 100, and after selecting a recent version or higher class of cipher algorithm, transmits to the terminal 100, the second cipher mode instruction message (Ciphering mode command (A5/3)) instructing the terminal 100 to perform the transmission and reception based on the selected algorithm.

Then, the terminal 100 may generate a cipher mode completion message (Ciphering mode complete) based on the A5/3 cipher algorithm according to the instruction of the second cipher mode instruction message, and attempt to transmit the message to the network system 200 (411). However, as depicted, because we assume that the terminal 100 does not normally operates the A5/3 cipher algorithm, the cipher mode completion message is not transferred to the network system 200.

Meanwhile, when an Ack signal is not received as a response to the transmission of the cipher mode completion message (Ciphering mode complete), the terminal 100 may attempt to transmit the cipher mode completion message a predetermined number of times or repeatedly for a predetermined time period as in step 413. And, when a set period of a timer expires as in step 413, the terminal 100 determines that a problem is caused at a link layer and may perform the previously operations again. That is, the terminal 100 may retransmit the location update request message (Location update request) to the network system 200 at step 415, and at step 417, transmit the cipher information message (Classmark change (A5/1,A5/3)) to the network system 200 as in step 403.

Then, the network system 200 may transmit an authentication information request message to the corresponding terminal 100, and as in the step 421, may receive an authentication information response message from the terminal 100. hen the network system 200 receives the authentication information response message, the network system 200 may identify that the corresponding terminal 100 had already failed to perform a location update process based on identity information, for example, ID of the terminal 100 and may transmit the first ciphering mode command message (A5/1) for instructing the terminal 100 to perform communication based on a cipher algorithm of a relatively low version (423). To do this, the network system 200 may temporarily store history related to a connecting attempt during a time period, and based on the history, may identify a reconnecting attempt of the same terminal 100.

The terminal 100 which receives the first ciphering mode command message (A5/1) may identify a cipher algorithm included in the first ciphering mode command message (A5/1) transmitted from the network system 200, write out a ciphering mode completion message based on a corresponding A5/1 cipher algorithm, and transmit it to the network system 200 (425).

Figure 5:
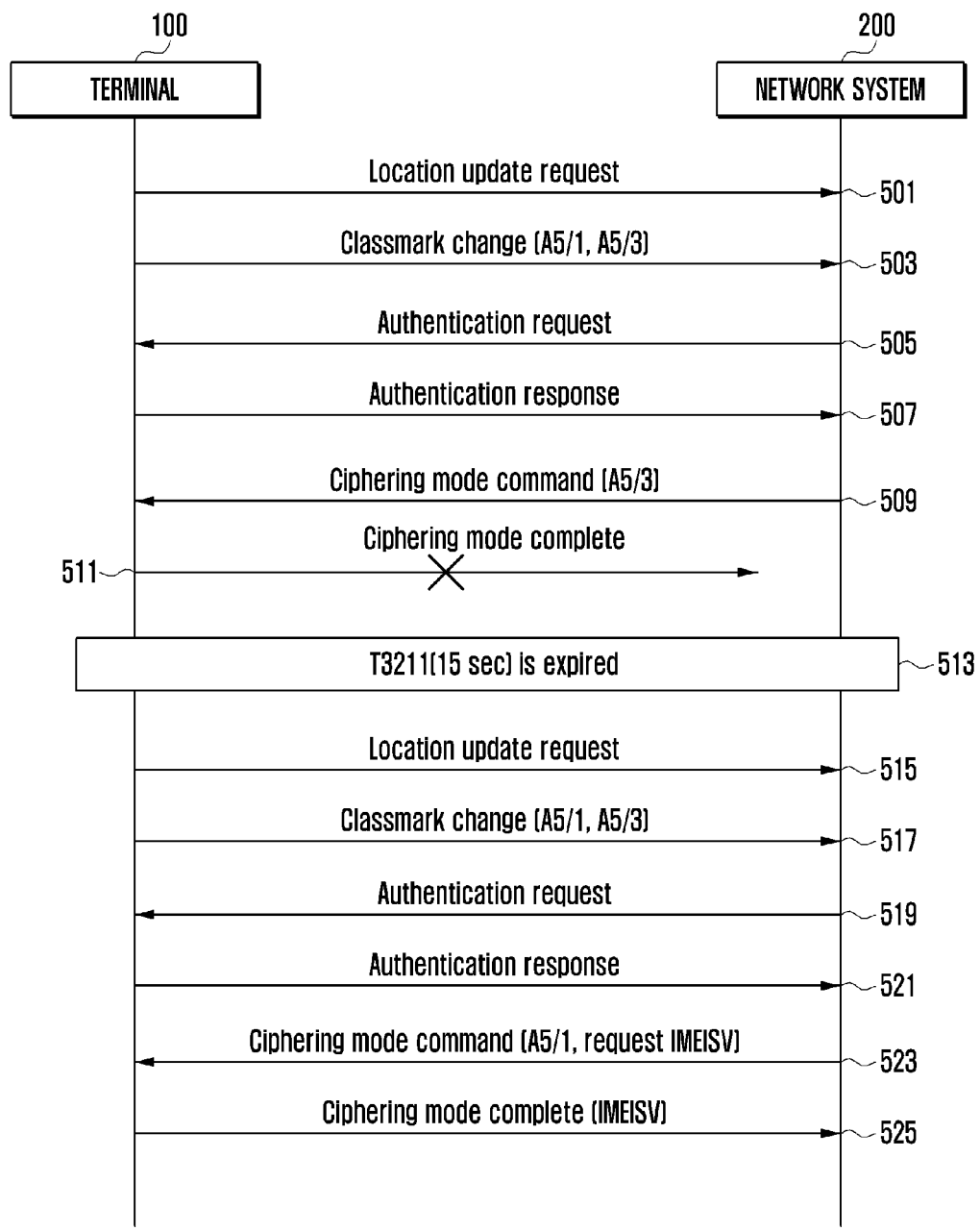
FIG. 5 is a signal flowchart illustrating a cipher-controlling procedure according to a third embodiment of the present invention.

FIG. 5 is a signaling flowchart illustrating a procedure of allowing the terminal 100 to provide identity information in a cipher-controlling method according to an embodiment of the present invention. In the following description, it is further assumed that a version or class of the A5/3 cipher algorithm is relatively newer or higher than that of the A5/1 cipher algorithm.

Referring to FIG. 5, the terminal 100 and the network system 200 may perform the procedure of steps 501 to 521 which is equivalent to the operations of steps 401 to 421. That is, when the terminal 100 transmits a location update request message and a cipher information message (Classmark change (A5/1, A5/3)) to the network system 200 at the steps 501 and 503, the network system 200 transmits an authentication information request message to the terminal 100 at the step 505. In response to that message, the terminal 100 transmits an authentication information response message to the network system 200 (507). Then, the network system 200 may transmit the second ciphering mode command message (A5/3) to the terminal 100 (509). Thus, the terminal 100 may try to transmit a ciphering mode completion message that is written based on an A5/3 cipher algorithm shown in step 511. After that, the terminal 100 performs a next step if the terminal 100 does not receive an additional response until a preset time interval expires after a timer starts to count down at the step 513.

That is, after the time interval indicated at the step 513 expires, the terminal 100 retransmits the location update request message (515), and then, the cipher information message (Classmark change (A5/1,A5/3)) to the network system 200 (517). The network system 200 transmits the authentication information request message to the terminal 100 (519), and the terminal 100 transmits the authentication information response message in response to the authentication information request message to the network system 200.

Then, the network system 200 transmits the third ciphering mode command message (Ciphering mode command (A5/1, request IMEISV)) to the terminal 100 (523). Here, the third ciphering mode command message (Ciphering mode command (A5/1, request IMEISV)) may be a message for requesting the identity information of the terminal 100 for example, IMEISV (IMEI and Software Version) for requesting IMEI and requesting to transmit it with the A5/1 cipher algorithm. That is, the network system 200 may request the identity information about the terminal 100 for indentifying whether the reason for failing the communication operation by the terminal 100 is due an abnormal or defective algorithm or a specific wireless environment the terminal 100.

When the terminal 100 receives the third ciphering mode command message (A5/1, request IMEISV) from the network system 200, identity information of the terminal 100, such as IMEISV including IMEI, is transmitted according to the content included in a corresponding message, and the third ciphering mode completion message based on an A5/1 algorithm is transmitted to the network system 200. Thus, the network system 200 may identify whether the terminal 100 is registered in the history table 251 using the IMEISV transmitted from the terminal 100 as an abnormal terminal where a problem is caused in ciphering. At this time, when the corresponding terminal 100 is not registered in the history table 251, that is the terminal 100 has no problem that relates to ciphering, or information about a problem related to ciphering is not registered, a message based on the corresponding terminal 100 and an A5/3 cipher algorithm may be requested to the terminal 100. To achieve this, although the network system 200 is not depicted, the network system 200 may transmit the second ciphering mode command message (A5/3) for requesting transmission/reception of a message based on the A5/3 cipher algorithm to the terminal 100. Then, the terminal 100 may transmit to the network system 200, a message necessary for a communication operating procedure based on the A5/3 cipher algorithm according to the request of the network system 200. When the network system 200 does not receive any messages based on the A5/3 cipher algorithm from the terminal 100 during a time period, the network system 200 may recognize the corresponding terminal 100 as the presence of a new terminal having a problem in the ciphering controlling process. Then, the network system 200 may newly register the corresponding terminal 100 in the history table 251 and support to manage it. Here, the network system 200 may further support transmission and reception of a message based on the previously indicated A5/1 cipher algorithm without individually performing any procedures after the step 525.

Meanwhile, when the identity information of the terminal 100 is registered in the history table 251, that is it is determined that the terminal 100 is abnormal based on the comparison, the network system 200 may support to transmit and receive a message based on the corresponding terminal 100 and the A5/1 cipher algorithm. In this procedure, since the network system 200 is in a state that has already requested the message transmission and reception based on A5/1 cipher algorithm to the terminal 100, the network system 200 may not transmit a message for indicating an additional cipher algorithm.

As described above, the cipher-controlling method according to the present invention supports to allow the terminal to suppress a use of an abnormal or defective cipher algorithm and instruct the terminal to use a normal or working cipher algorithm, based on the procedures of instructing the terminal to select and operate a predetermined cipher algorithm according to cipher information provided from the terminal, collecting identity information about the terminal when in a state that a message of cipher mode completion algorithm is not received from the terminal, the same process procedure is performed, and identifying whether the identity information about the terminal is registered in a history table which is previously prepared and includes a list of problematic terminals, each of the problematic terminals having history of operating the abnormal cipher algorithm.

Figure 6:
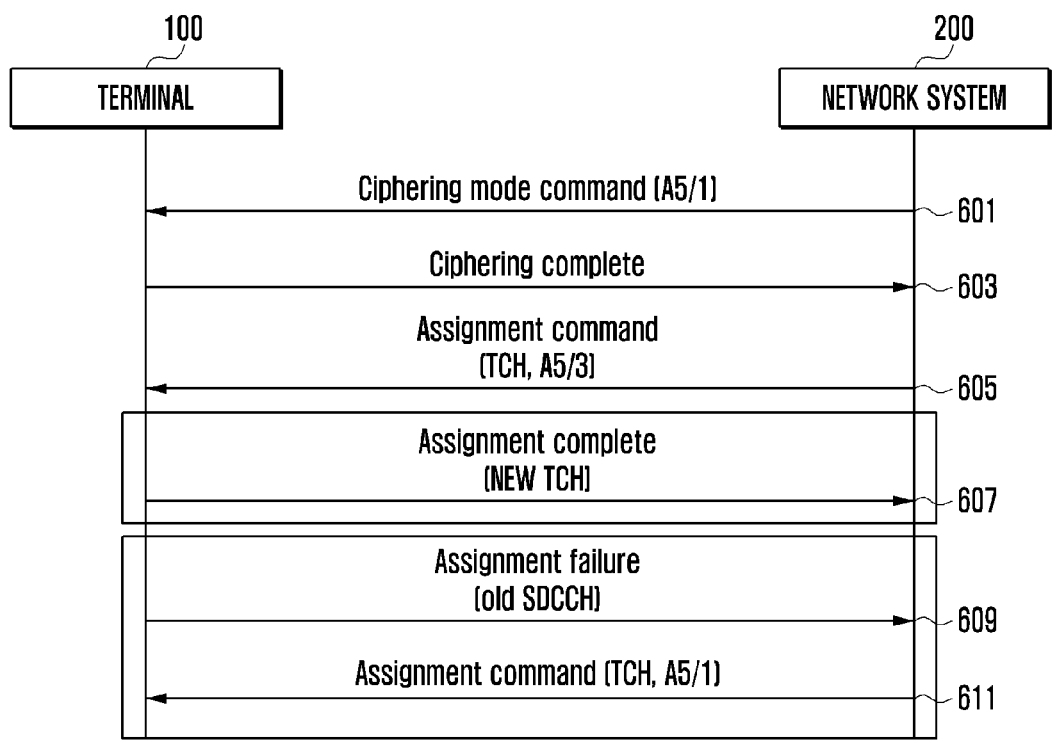
FIG. 6 is a signal flowchart illustrating a cipher-controlling procedure according to a fourth embodiment of the present invention.

FIG. 6 is a signal flowchart illustrating a cipher-controlling procedure through a previously authenticating procedure of a terminal 100 in a cipher-controlling method according to an embodiment of the present invention.

Referring to FIG. 6, the network system 200 may generate the first ciphering mode command message (A5/1) which instructs the terminal 100 to perform the message transmission and reception based on a previously verified or the latest version of cipher algorithm and may transmit it to the terminal 100 (601). Then, in response to the message transmitted from the network system 200, the terminal 100 a ciphering completion message to the network system 200 (603). That is, the terminal 100 informs the network system 200 that the terminal 100 can normally process the first ciphering mode command message (A5/1) requested by the network 200.

Then, the network system 200 transmits an assignment command message (TCH, A5/3) to the terminal 100 (605). That is, the network system 200 may transmit a message for identifying whether the terminal 100 can normally perform the A5/3 algorithm which is a new version of cipher algorithm.

When the terminal 100 transmits the assignment command message (TCH, A5/3) to the network system 200, the terminal may transmit an assignment completion message (NEW TCH) to the network system 200 if it is possible to perform a message transmission based on the cipher algorithm indicated in the corresponding message (607). Meanwhile, when the terminal 100 cannot normally operate the cipher algorithm instructed in the assignment command message (TCH, A5/3), the terminal 100 transmits an assignment failure message (old SDCCH) to the network system 200 (609). Then, the network system 200 may transmit the assignment command message (TCH, A5/1) for requesting the corresponding terminal 100 to use an operable cipher algorithm to the terminal 100.

The cipher-controlling method according to the present invention may support a cipher algorithm control of a terminal based on the procedures of transmitting a cipher mode instruction message of instructing the terminal to be operated based on a predetermined cipher algorithm to the terminal, transmitting an assignment instruction message of instructing the terminal to operate based on another cipher algorithm when receiving a cipher completion message from the terminal, and determining whether the terminal is a problematic terminal according to a response state of the terminal.

Figure 7:
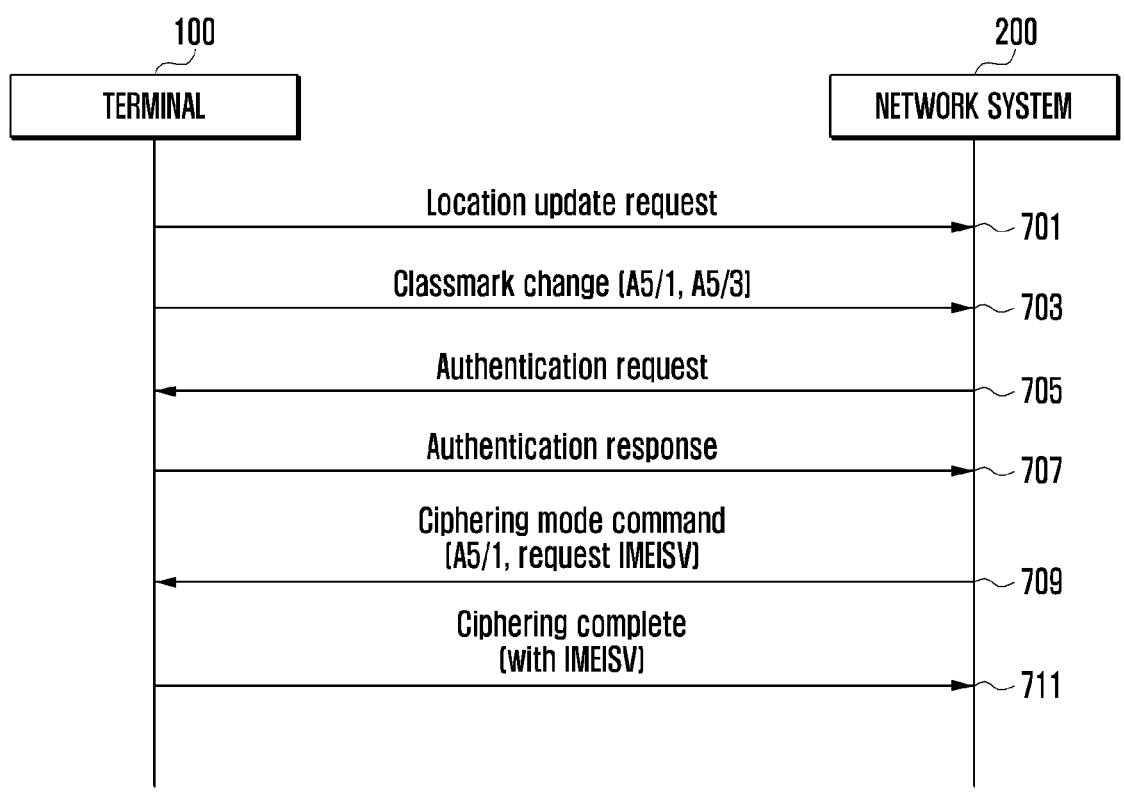
FIG. 7 is a signal flowchart illustrating a cipher-controlling procedure according to a fifth embodiment of the present invention.

FIG. 7 is signal flowchart illustrating a cipher-controlling procedure based on first-process, next-confirmation operation in a cipher-controlling method according to an embodiment of present invention.

Referring to FIG. 7, the mobile terminal 100 transmits a location update request message to the network system 200 (701), and as in step 703, transmits a cipher information message (Classmark change (A5/1,A5/3)) to the network system 200. Then, the network system 200 may request an authentication request message from the terminal 100 (705), and the terminal 100 may transmit an authentication response message (707) to the network system 200.

When the authentication is completed, the network system may transmit the fourth ciphering mode command message (A5/1, request IMEISV) to the terminal 100 (709). The fourth ciphering mode command message (A5/1, request IMEISV) may be a message for requesting identity information on the corresponding terminal 100, while the network system 200 performs data encryption together with the terminal 100 based on the lowest class of cipher algorithm operable with the terminal 100 or a specific class of cipher algorithm selected according to a predefined policy.

Then, in response to the fourth ciphering mode command message (A5/1, request IMEISV) transmitted from the network system 200, the terminal 100 may transmit the second cipher completion message (with IMEISV). The second cipher completion message (with IMEISV) may be a message encrypted with a specific class of cipher algorithm instructed by the network system 200. Here, the specific class of cipher algorithm is an algorithm which is relatively universalized and verified in reliability, compared with a higher or newer class of cipher algorithm.

When the network system 200 receives the second ciphering completion message (with IMEISV) from the terminal 100, the network system 200 may extract IMEI of IMEISV information from the corresponding message and may identify whether the terminal 100 is a problematic terminal having a problem in ciphering.

Here, the network system 200 may refer to a previously stored history table 251 to determine whether the corresponding terminal 100 has a problem in ciphering, and if so, the network system 200 may maintain a state of performing data encryption with a specific class of cipher algorithm set currently.

Meanwhile, based on a class is higher than that of the corresponding terminal 100 which has no problem in cipher or has no specific information related to a cipher problem a terminal, that is on the A5/3 cipher algorithm, a class of which is newer or higher than classes of cipher algorithms included in the cipher information message (Classmark change (A5/1, A5/3)) received at step the 703, the network system 200 may transmit and receive a message for instructing the terminal 100 to perform data encryption to or from the terminal 100. Here, when the terminal 100 has no information and it fails to apply a higher cipher algorithm, the network system 200 may control a procedure according to an application of a newer or higher class of cipher algorithm.

Thus, a cipher-controlling method according to the present invention may support a cipher algorithm control of a terminal based on the processes of instructing the terminal to operate in a predetermined cipher algorithm and requesting identity information about the terminal, when the identity information is received from the terminal, and identifying whether the identity information is registered in a history table which is previously prepared and includes a list of problematic terminals with a history of operating the abnormal or defective cipher algorithm.

Figure 8:
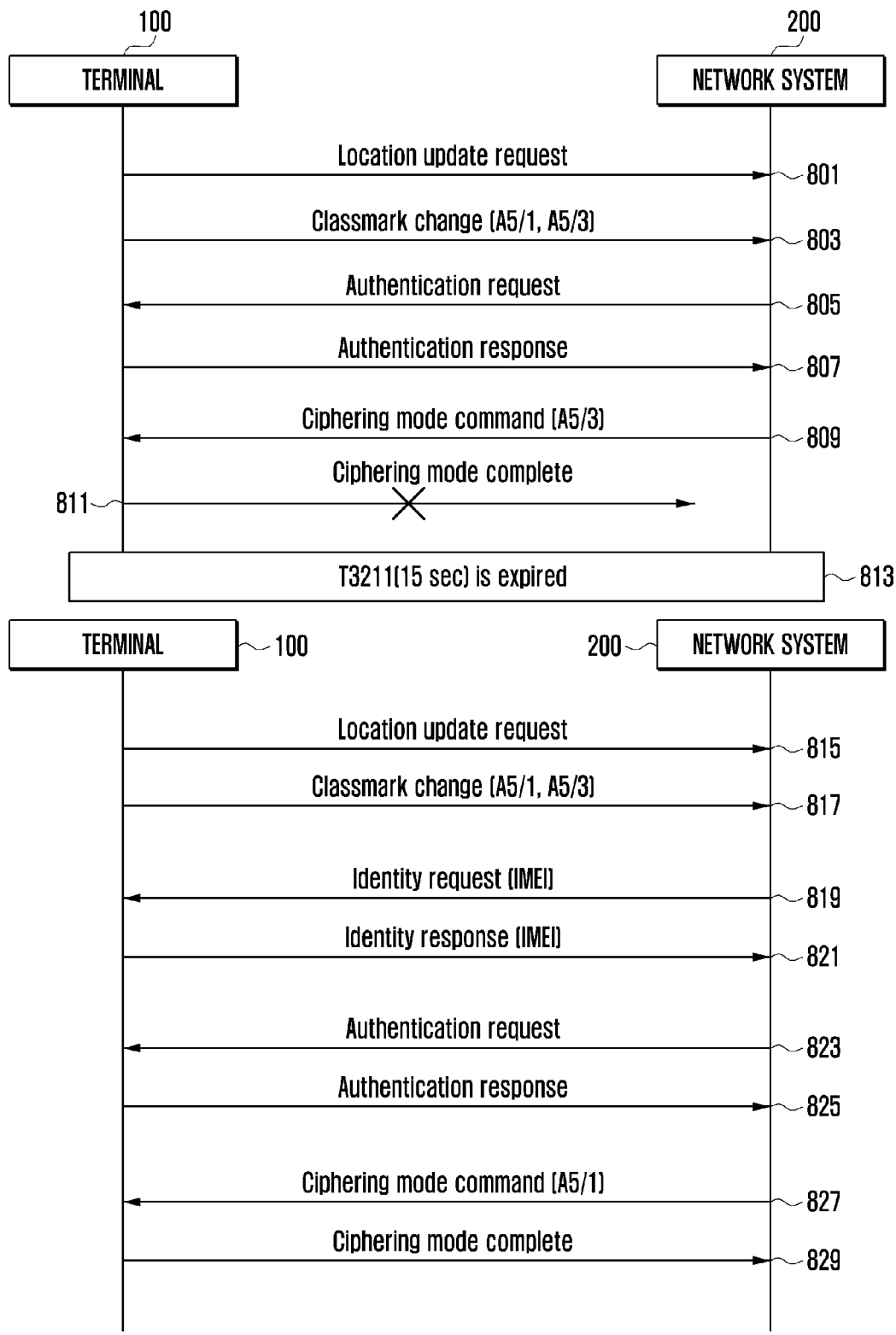
FIG. 8 is a signal flowchart illustrating a cipher-controlling procedure according to a sixth embodiment of the present invention.

FIG. 8 is a signal flowchart illustrating a cipher-controlling procedure through checking a problem of a selective terminal in a cipher-controlling method according an embodiment of the present invention.

Referring to FIG. 8, the terminal 100 and the network system 200 may perform steps 801 to 817 which are the same as the steps 501 to 517. That is, the terminal 100 transmits a location update request message and a cipher information message (Classmark change (A5/1,A5/3)) to the network system 200 (801, 803). Then, the network system 200 transmits an authentication information request message to the terminal 100. The terminal 100 an authentication response message to the authentication information request message to the network system 200 (807). Then, the network system 200 transmits the second ciphering mode command message (A5/3) to the terminal 100. The terminal 100 may try to transmit a ciphering mode completion message which is written based on the A5/3 cipher algorithm in response to it to the network system 200. At this time, if it is assumed that the terminal 100 cannot normally operate the A5/3 cipher algorithm or cannot normally transmit a corresponding message because of poor radio environment, the attempt to transmit the ciphering mode completion message mentioned above may be performed (813). Then, the terminal 100 again transmits the location update request message and the cipher information message to the network system 200 (815, 817).

Thereafter, the network system 200 may transmit an identity information request message (IMEI) for providing identity information of the corresponding terminal 100 to the terminal 100 (819). The terminal 100 transmits an identity information response message including the IMEI information to the network system 200 in response to the identity information request (821). To this end, the network system 200 may store and manage information about the fact that the corresponding terminal 100 had previously transmitted the location update request message at the step 801. When the same terminal 100 retransmits the location update request message at the step 815, the network system 200 may transmit the identity information request message (IMEI) (819).

Next, the network system 200 transmits an authentication information request message to the terminal 100 according to a procedure (823). The terminal 100 transmits an authentication information response message to the terminal 100 in response to the authentication information request. Then, when the network system 200 identifies the fact that the corresponding terminal 100 has a problem in ciphering through IMEI information check and based on comparison to a history table 251, the network system 200 may transmit the first ciphering mode command message (A5/1) to the terminal 100 (827). The terminal 100 may transmit a ciphering mode completion message based on the A5/1 cipher algorithm instructed in the corresponding message to the network system 200 in response to the first ciphering mode command message (A5/1) (829).

Meanwhile, when the terminal 100 has no problem in ciphering through the IMEI information check and referring to the history table 251, the network system 200 may transmit the second ciphering mode command message (A5/3) to the terminal 100 to support data encryption based on a newer or higher class of cipher algorithm.

Further, when the result of comparison to the history table 251 is that the network system 200 cannot know information about a cipher of the terminal 100, the network system 200 proceeds with transmission of the second ciphering mode command message A5/3 and a response procedure to it, and controls such that when a corresponding procedure is failed, transmission of the first ciphering mode command message (A5/1) of a lower class and a response procedure to it proceed.

As described above, a cipher-controlling method of the present invention can support a cipher algorithm selecting control of a terminal based on the process of instructing the terminal to selectively operate a predetermined cipher algorithm of cipher information provided from the terminal, collecting identity information about the terminal when at a state that a message of cipher mode completion algorithm is not received from the terminal, the same process procedure is performed, identifying whether the identity information about the terminal is registered in a history table which is previously prepared and includes a list of problematic terminals, each of the problematic terminals having history of operating the abnormal cipher algorithm, allowing the network system to request and collect the identity information about the terminal, and identifying whether the identity information about the terminal is registered in a history table which is previously prepared and includes a list of problematic terminals, each of the problematic terminals having history of operating the abnormal cipher algorithm.

Meanwhile, although in the above description, it is described to apply a selective cipher algorithm base on two cipher algorithms, the present invention is not limited by these examples. That is, the present invention may be operated based on two cipher algorithms or more. In this case, signal transmission and reception between the terminal 100 the network system 200 and the terminal 100 may be performed to transmit data based on a cipher algorithm operable in the terminal 100.

Figure 9:
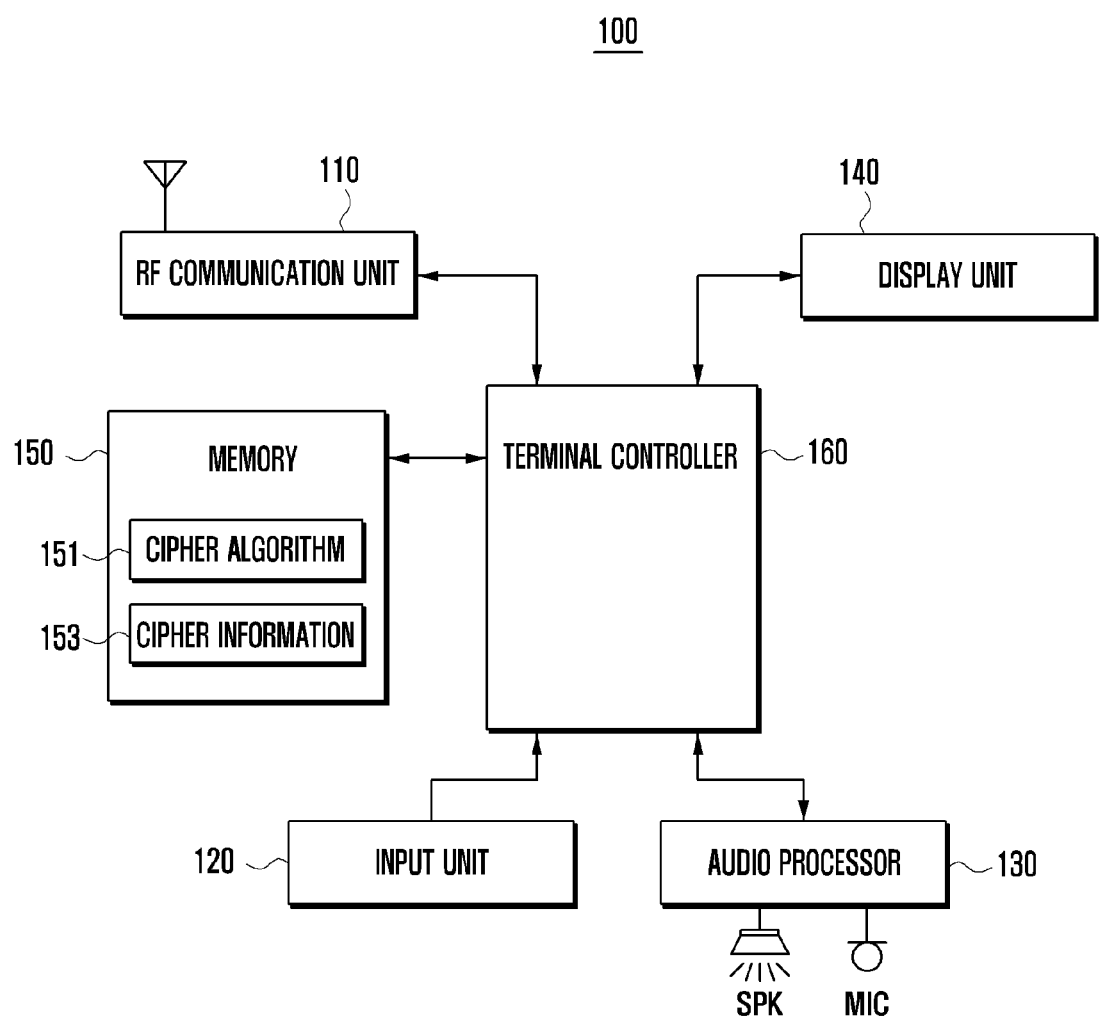
FIG. 9 is a block diagram illustrating a configuration of a terminal more in detail according to still another exemplary embodiment of the present invention.

FIG. 9 is a block diagram illustrating a configuration of a terminal 100 according to an embodiment of the present invention.

Referring to FIG. 9, a terminal 100 of the present invention may include a radio frequency (RF) communication unit 110, an input unit 120, an audio processor 130, a display unit 140, a memory 150 and a controller 160.

The terminal 100 of the present invention, such as the above configuration, may perform operating a communication channel with the network system 200 through the RF communication unit 110. In this case, the terminal 100 may perform data encryption for a communication channel operation with the network system 200, and to do this, may store at least one cipher algorithm 151 in the memory 150 to operate it. Particularly, the terminal 100 of the present invention may support to communicate with the network system 200 based on an actual operable cipher algorithm 151 by managing cipher information 153 related to a cipher algorithm 151.

The RF communication unit 110 may include a communication module according to at least one communication scheme of various communication schemes in order to form a channel for communicating with the network system 200. For example, the RF communication unit 110 may include not only a communication module for supporting a communication scheme, such as CDMA, GSM and the like, but also at least one of communication modules for supporting various communication schemes, such as WCDMA, OFDMA and the like. Particularly, the RF communication unit 110 of the present invention may include a communication module having a circuit switched (CS) connection. Further, the RF communication unit 110 may include a communication module having a packet switched (PS) connection based on protocol control and message definition for a cipher control of the present invention. The RF communication unit 110 supports a communication channel for transmitting and receiving various messages to and from the network system 200.

The input unit 120 may include a side key, specially a hot key and the like when the terminal 100 is manufactured in a type of full-touch screen, and may be replaced by a key map displayed on the touch screen. The input unit 120 may include the plurality of input keys and functional keys for receiving numeral and letter information and setting various functions.

The functional keys may include a directional key, a side key, an accelerator key and the like, which are set for performing a specific function. Particularly, the input unit 120 may generate an input signal for turning on or off the terminal 100 according to a user control. When the terminal 100 switches from a turn-off state to a turn-on state and is located in a coverage area of the network system 200, the terminal 100 may perform the cipher-controlling procedure described above while the terminal 100 is registered in the corresponding network system 200.

The audio processor 130 may include a speaker SPK for outputting various audio data generated during operating the terminal 100 and a microphone MIC for collecting audio data. Particularly, the audio processor 130 of the present invention may provide a predetermined effective sound with respect to a procedure during connecting the terminal 100 with the network system 200. For example, the audio processor 130 may support to output an effective sound corresponding to the fact that while connecting to the network system 200, a cipher-controlling procedure is failed. This effective sound output may be omitted according to setting of the terminal 100.

The display unit 140 displays information provided input by a user or information provided to the user as well as various menus of the terminal 100. That is, the display unit 140 may provide various pictures, such as a standby picture, a menu picture, a message writing picture, a call picture, a terminal power-off picture, a terminal booting picture, etc. This display unit 140 may be manufactured in a form of a flat display panel such as a liquid crystal display (LCD), an organic light emitted diode (OLED) and the like. The display unit 140 is manufactured in a structure of including a display panel and a touch panel according to a manufacturing type. Particularly, the display unit 140 may support various pictures related to a procedure of operating a communication channel of the network system 200. For example, when a ciphering control is failed during a communication channel operation with the network system 200, the display unit 140 may output a text or image of indicating the corresponding failure. Further, during a communication channel operation with the network system 200, the display unit 140 may output a text, image, icon and the like of instructing set cipher information 153. Thus, a user may receive a feedback related to whether there is a problem in his cipher algorithm 151, and a proper measure for example, a procedure for removing a cipher algorithm which is abnormally executed and newly installing a corresponding cipher algorithm may proceed.

The terminal memory 150 stores a screen image and the like output to the display unit 140 as well as an application program necessary for a functional operation according to an embodiment of the present invention. And, when the display unit 140 includes a touch screen, the terminal memory 150 may store a key map, a menu map, information about a touch-lock part releasing area and the like. Here, the key map and menu map may have various forms, respectively. That is, the key map may include a keyboard map, a 3*4 key map, the qwerty key map and the like, and may become a control key map for controlling an operation of a currently activated application program. Further, the menu map may become a menu map for controlling an operation of a currently activated application program. This terminal memory 150 may chiefly include a program area and a data area.

An operating system (OS) for booting the terminal 100 and operating each element described above, various user applications such as a user function for supporting a call function of the terminal 100, a web browser for access to an Internet server, an MP3 user function for reproducing other sound sources, an image output function for reproducing a picture and the like, a moving picture reproducing function and the like may be stored in the program area. Particularly, a cipher algorithm 151 necessary for encryption during operating the RF communication unit 110 may be stored in the program area of the present invention. Here, the cipher algorithm 151 may be configured in various forms, and particularly, include a cipher algorithm, such as A5/1, A5/3 and the like, during a procedure of communicating with the network system 200. This cipher algorithm 151 may be added or updated according to a development of a developer.

As the data area is an area for storing data generated according to a use of the terminal 100, phone book data, at least one icon according to a widget function and various contents may be stored therein. Particularly, cipher information 135 may be stored in the data area. The cipher information 135 may include an index or distinguishing information set while the terminal 100 performs a communication channel operation with the network system 200. For example, when the terminal 100 performs communication with the network system 200 based on the A5/1 cipher algorithm, the cipher information 153 may include an index or distinguishing information which indicates the A5/1 cipher algorithm. Further, when the terminal 100 uses the A5/3 cipher algorithm while performing a communication channel operation with the network system 200, the cipher algorithm may include an index or distinguishing information which indicates the corresponding cipher algorithm. Further, the cipher information 153 may include at least one of a name, an index, and distinguishing information about the stored cipher algorithms 151. The cipher information 153 which includes information about all cipher algorithms 151 may be included in a cipher information message during a communication channel operating procedure with the network system 200 and be transmitted through it.

The terminal controller 160 controls supplying an electric power to each element of the terminal 100 to support to perform initiating procedures of each element. And, the terminal controller 160 may control various message transmission and reception necessary for operating the terminal 100 while performing a cipher-controlling procedure according to an embodiment of the present invention. To do this, the terminal controller 160 may include a configuration depicted in FIG. 10.

Figure 10:
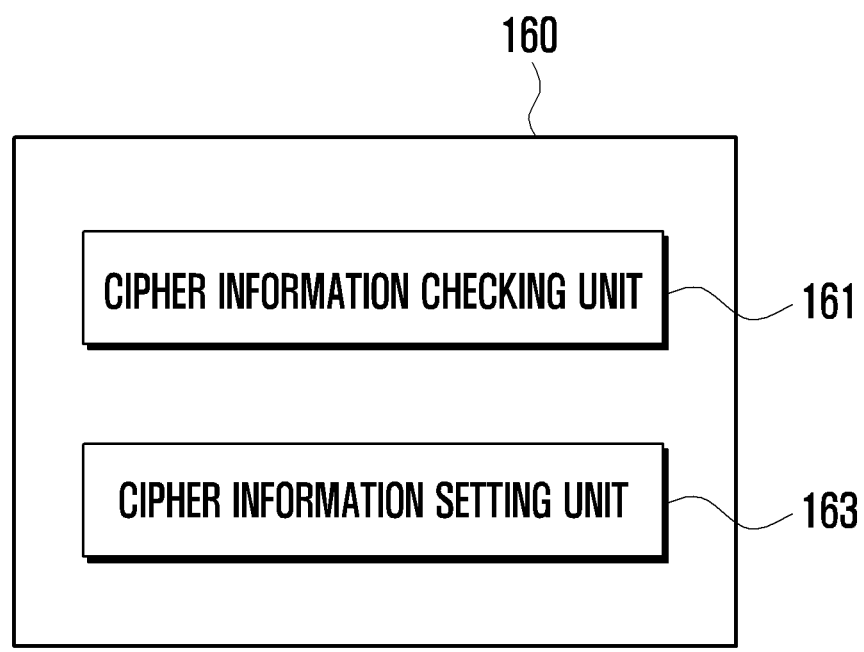
FIG. 10 is a block diagram illustrating a configuration of the terminal controller in more detail according to still another exemplary embodiment of the present invention.

FIG. 10 is a block diagram in more detail illustrating a configuration of the terminal controller 160 of the present invention.

Referring to FIG. 10, the terminal controller 160 may include a cipher information checking unit 161 and a cipher information setting unit 163.

In operation, the cipher information checking unit 161 checks the cipher information 153 stored in the terminal memory 150 when message transmission and reception for operating a communication channel between the terminal 100 and the network system 200 is performed. The cipher information checking unit 161 may generate a cipher information message including cipher information 153 stored according to a request of the network system 200 and control such that it is transmitted. In this case, the cipher information checking unit may collect information about algorithms which are included in the cipher algorithm of the terminal 100 or installed in the terminal 100 and generate a cipher information message. Further, the cipher information checking unit 161 may identify which ciphering mode is set between the terminal 100 and the network system 200, and support to output text, image or icon information corresponding to the ciphering mode.

The cipher information setting unit 163 receives the cipher information determined in a communication channel operation between the terminal 100 and the network system 200 from the cipher information checking unit 161. Then, the cipher information setting unit 163 may control such that the cipher information 153 stored in the terminal memory 150 is updated. That is, the cipher information setting unit 163 may identify a cipher algorithm in which a problem is caused based on the ciphering mode determined in the communication channel operation between the terminal 100 and the network system 200 in a state of including the plurality of cipher algorithms. And, the cipher information setting unit 163 may identify information about a cipher algorithm in which a problem is caused, and determine the cipher algorithm corresponding to a set ciphering mode between the terminal 100 and the current network system 200 as valid cipher information. When it is identified that the valid cipher information is used in a normal operation, the cipher information setting unit 163 may control such that the cipher information 153 of the terminal memory 150 is updated.

Thus, the cipher information checking unit 161 may write a cipher information message including only valid cipher information when later transmitting the cipher information message to the network system 200, and control such that the written cipher information message is transmitted. Meanwhile, when a new cipher algorithm is received from an external and is installed, the cipher information setting unit 163 may control such that the corresponding cipher algorithm is stored in the terminal memory 150 and control such that information about the new cipher algorithm is included in the cipher information. That is, the cipher information setting unit 163 may control such that the cipher algorithm update is performed. And, the cipher information setting unit 163 may control such that the newly set and stored cipher algorithm is added to the cipher information 153 stored in the terminal memory 150 and the cipher information 153 is updated with it. When the cipher information 153 transmits the cipher information message to the network system 200 during a procedure of operating a communication channel with the network system 200, the cipher information checking unit 161 may write and transmit a cipher information message based on the newly updated cipher information 153.

Figure 11:
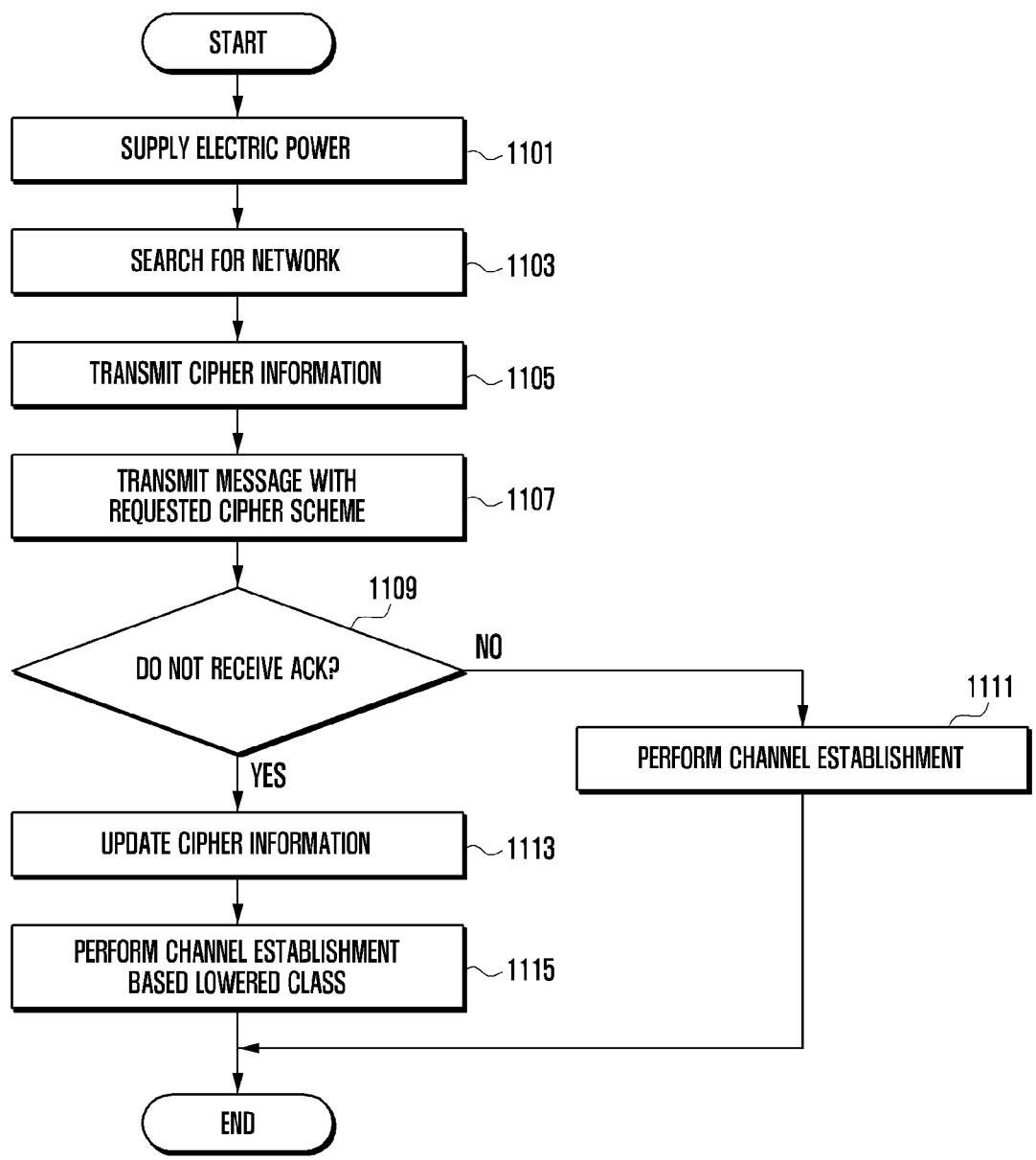
FIG. 11 is a flowchart illustrating a terminal operating method still another exemplary embodiment of the present invention.

FIG. 11 is a flowchart illustrating a terminal operating method of supporting a cipher-controlling method according to an embodiment of the present invention.

Referring to FIG. 11, in the terminal operating method, the terminal controller 160 may control such that an electric power is provided to each element of the terminal 100 (1101). Then, the terminal controller 160 may perform a network search (1103). The terminal controller 160 may transmit cipher information to the searched network system 200 (1105). In this case, the terminal controller 160 may control such that a cipher information message is transmitted to the network system 200 together with a location request message. To do this, the terminal controller 160 may exhaust the cipher information 153 stored in the terminal memory 150, and write the cipher information message including corresponding cipher information 153.

When the network system 200 instructs the terminal controller 160 to perform data cipher with a specific cipher algorithm, the terminal controller 160 may encrypt a message according to a requested cipher way and then, control such that the corresponding message is transmitted to the network system 200 (1107). Here, the terminal controller 160 may identify whether the cipher algorithm is operable normally. To this end, the terminal controller 160 may identify whether 'Ack' is not received from the network system 200, an IMEI request is received, or assignment failure is caused (1109). Here, when 'Ack' is normally received from the network system 200, an individual IMEI request is not received, or a cipher completion message is successfully transmitted, the terminal controller 160 perform a communication channel establishment for supporting communication service (1111).

Meanwhile, when the terminal controller 160 does not normally receive a response to a cipher message with a specific cipher algorithm, or a specific cipher algorithm is not normally operated, the terminal controller 160 control such that the cipher information stored in the terminal memory 150 is updated (1113). The terminal controller 160 may perform a channel establishment based on a cipher algorithm having a lowered class (1115).

As described above, a terminal and a terminal operating method of the present invention may update information about a cipher algorithm which is not normally operable and support to perform a communication channel operation based on an operable cipher algorithm when a specific cipher algorithm is not normally operable in a communication channel operating procedure with the network system 200. Further, a terminal and a terminal operating method of the present invention may support to allow a user to take suitable measures by providing information about an abnormally operated cipher algorithm through the display unit 140 to the user. Thus, a terminal and a terminal operating method of the present invention may support to perform message transmission and reception with the network system 200 based on cipher information which is able to be normally operated by the terminal 100.

According to the present invention, a configuration of a terminal operating method includes transmitting cipher information to a network system, the cipher information including a plural cipher algorithms which encrypts data transmitted and received when a communication channel is operated with the network system and information about the plural cipher algorithms, and performing a communication channel operation based on a cipher algorithm indicated by the network system.

The foregoing portable terminal 100 may further include various additional modules according to provision forms. That is, when the portable terminal 100 is a communication terminal, it may include constructions that are not mentioned such as a near distance communication module for near distance communication, an interface exchanging data in a wired communication scheme or a wireless communication scheme of the portable terminal 100, an Internet communication module communicating with an Internet to perform an Internet function, and a digital broadcasting module receiving and broadcasting digital broadcasting. Since the structural elements can be variously changed according to convergence trend of a digital device, no elements can be listed. However, the portable terminals 100 and 200 may include structural elements equivalent to the foregoing structural elements. Further, the portable terminals 100 and 200 of the present invention may be substituted by specific constructions in the foregoing arrangements according to the provided form or another structure. This can be easily understood to those skilled in the present art.

Further, the portable terminals 100 and 200 according to an embodiment of the present invention may include various types of devices supporting a communication service forward function. For example, the portable terminal 100 may include an information communication device and a multimedia device such as a Portable Multimedia Player (PMP), a digital broadcasting player, a Personal Digital Assistant (PDA), a music player (e.g., MP3 player), a portable game terminal, a Smart Phone, a notebook computer, and a handheld PC as well as various mobile communication terminals corresponding to various communication systems.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of exchanging cipher information between a terminal and a network system, comprising:
   transmitting, by the terminal, the cipher information relating to a cipher algorithm operation to the network system;
   detecting, by the network system, whether the terminal is operating an abnormal cipher algorithm according to comparison to a history table; and
   when the terminal detected as operating the abnormal cipher algorithm, instructing the terminal to perform a communication channel operation based on a normally operable cipher algorithm by the network system.

2. The method of claim 1, wherein detecting whether the terminal is operating the abnormal cipher algorithm comprises:
   collecting an identity information of the terminal by the network system; and
   identifying whether the identity information of the terminal is registered in the history table,
   wherein the history table includes a list of terminals operating the abnormal cipher algorithm.

3. The method of claim 1, wherein detecting whether the terminal is operating the abnormal cipher algorithm comprises:
   transmitting, by the network system, to the terminal a request to select a predetermined cipher algorithm; and
   detecting that the terminal is operating the abnormal algorithm when a cipher mode completion message is not received from the terminal in response to the request.

4. The method of claim 1, wherein detecting whether the terminal is operating the abnormal cipher algorithm comprises:
   transmitting, by the network system, to the terminal a request to select a cipher algorithm according to the cipher information provided from the terminal;
   collecting identity information of the terminal when a cipher mode completion message is not received from the terminal in response to the request; and
   detecting, by the network system, whether the identity information of the terminal is registered in the history table including a list of terminals operating the abnormal cipher algorithm.

5. The method of claim 1, wherein detecting whether the terminal is operating the abnormal cipher algorithm comprises:
   transmitting, by the network system, a cipher mode instruction message instructing the terminal to operate a particular cipher algorithm; and
   in response to receiving a cipher mode completion message from the terminal, transmitting, by the network system, an assignment instruction message instructing the terminal to operate another particular cipher algorithm.

6. The method of claim 1, wherein detecting whether the terminal is operating the abnormal cipher algorithm comprises:
   instructing the terminal by the network system to operate particular cipher algorithm and requesting identity information of the terminal; and
   when the identity information is received from the terminal, detecting whether the identity information is registered in the history table including a list of terminals operating the abnormal cipher algorithm.

7. The method of claim 1, wherein detecting whether the terminal is operating the abnormal cipher algorithm comprises:
   instructing the terminal by the network system to selectively operate a particular cipher algorithm of cipher information stored in the terminal;
   in response to not receiving a message of cipher mode completion algorithm from the terminal, collecting, by the network system, identity information of the terminal; and
   detecting, by the network system, whether the identity information of the terminal is registered in the history table including a list of terminals operating the abnormal cipher algorithm.

8. A communication system for exchanging cipher information, comprising:
   a terminal configured to store plural cipher algorithms and establishing a communication channel with a network system based on one of the plural cipher algorithms; and
   the network system configured to detect whether the terminal is operating an abnormal cipher algorithm based on a history table, and when the terminal is operating the abnormal cipher algorithm, instruct the terminal to execution communication according to a normally operable cipher algorithm.

9. The communication system of claim 8, wherein the network system further comprises:
   a system memory configured to store the history table including a list of terminals operating the abnormal cipher algorithm; and
   a system controller configured to:
      request identity information of the terminal, identifying whether the requested identity information is registered in the history table, and
      when the requested identity information is registered in the history table, transmit a cipher mode instruction message to the terminal, such that the terminal is instructed to execute communication using the normally operable algorithm.

10. The communication system of claim 8, wherein the network system is further configured to:
   instructs the terminal to operate based on one of the cipher algorithms provided from the terminal,
   detect that the terminal is operating the abnormal cipher algorithm when a cipher mode completion message based on one of the cipher algorithms is not received from the terminal, and
   transmits a cipher mode instruction message to the terminal to instruct the terminal to communicate using the normally operable cipher algorithm,
   transmits an assignment instruction message to instruct the terminal to operate based on another cipher algorithm when receiving the cipher completion message from the terminal, and
   determines whether the terminal is a problematic terminal according to a response state to the assignment instruction message, and
   transmits a cipher mode instruction message to the terminal to instruct the terminal to perform a communication using the normally operable cipher algorithm.

11. The communication system of claim 8, wherein the network system comprises:
- a system memory configured to store the history table including a list of terminals operating the abnormal cipher algorithm; and
- a system controller configured to
  - instruct the terminal to operate one of the cipher algorithms provided from the terminal,
  - retrieve identity information of the terminal when a cipher mode completion message is not received from the terminal,
  - detect whether the identity information of the terminal is registered in the history table, and
  - transmit a cipher mode instruction message to the terminal to instruct the terminal to communicate using the normally operable cipher algorithm based on a result of the identifying whether the identity information of the terminal is registered.

12. The communication system of claim 8, wherein the network system comprises
- a system memory configured to store the history table including a list of terminals operating the abnormal cipher algorithm; and
- a system controller configured to:
  - instruct the terminal to operate one of the cipher algorithms,
  - request an identity information of the terminal and detect whether the identity information is registered in the history table, and
  - transmit a cipher mode instruction message to the terminal instructing the terminal to communicate using the normally operable cipher algorithm based a result of on the detecting whether the identity information of the terminal is registered.

13. A terminal for supporting a cipher control, comprising:
- a RF communication unit configured to establish a communication channel with a network system;
- a memory configured to store a cipher information indicating a plurality of cipher algorithms available to encrypt data required for operating the established communication channel with the network system; and
- a controller configured to transmit the cipher information to the network system and controlling such that the communication channel with the network system is performed based on a particular cipher algorithm indicated by the network system,
- wherein the particular cipher algorithm is selected based on a comparison, executed by the network system of the cipher information to a history table that includes a list of terminals operating an abnormal cipher algorithm.

14. The terminal of claim 13, further comprising:
- a display configured to displaying information of the abnormal cipher algorithm when the abnormal cipher algorithm is indicated by the network system.

15. The terminal of claim 13, wherein the controller updates the cipher information when receiving an additional cipher algorithm from an exterior source.

16. The terminal of claim 13, wherein when an abnormal cipher algorithm is detected by the comparison, the controller removes the abnormal cipher algorithm from the cipher information to indicate the abnormal cipher algorithm is not available to encrypt data.

17. A method of operating a terminal supporting cipher control, the method comprising:
- transmitting cipher information to a network system, the cipher information including a plurality of cipher algorithms available to encrypts data transmitted to and received from the network system; and
- establishing a communication channel link with the network system based on a particular cipher algorithm selected by the network system,
- wherein the particular cipher algorithm is selected by the network system comparing the cipher information to a history table including a list of terminals operating an abnormal cipher algorithm.

18. The method of claim 17, further comprising:
- receiving an additional cipher algorithm from an external source; and
- updating the cipher information to include the additional cipher algorithm.

19. The method of claim 17, further comprising:
- removing the abnormal cipher algorithm from the plurality of cipher algorithms according to a communication operation with the network system.

* * * * *

UNITED STATES PATENT AND TRADEMARK OFFICE
CERTIFICATE OF CORRECTION

| | | |
|---|---|---|
| PATENT NO. | : 8,990,609 B2 | Page 1 of 1 |
| APPLICATION NO. | : 13/633203 | |
| DATED | : March 24, 2015 | |
| INVENTOR(S) | : Sanghyun Lee et al. | |

It is certified that error appears in the above-identified patent and that said Letters Patent is hereby corrected as shown below:

IN THE CLAIMS:

Column 18, Claim 10, Line 49 should read as follows:
--...instruct the terminal to...--

Column 18, Claim 10, Line 55 should read as follows:
--...transmit a cipher mode...--

Column 18, Claim 10, Line 58 should read as follows:
--...transmit an assignment instruction...--

Column 18, Claim 10, Line 62 should read as follows:
--...determine whether the terminal...--

Column 18, Claim 10, Line 65 should read as follows:
--...transmit a cipher mode...--

Column 19, Claim 11, Lines 6-7 should read as follows:
--...configured to: instruct the...--

Column 19, Claim 12, Lines 20-21 should read as follows:
--...system comprises: a system...--

Column 19, Claim 12, Lines 32-33 should read as follows:
--...based on a result of detecting...--

Column 20, Claim 17, Line 24 should read as follows:
--...available to encrypt data...--

Signed and Sealed this
Fourteenth Day of July, 2015

Michelle K. Lee
*Director of the United States Patent and Trademark Office*